(12) United States Patent
Kyuma et al.

(10) Patent No.: US 6,573,930 B2
(45) Date of Patent: Jun. 3, 2003

(54) IMAGE PICKUP APPARATUS FOR STORING, READING-OUT AND PROCESSING A SIGNAL DURING PREDETERMINED TIME PERIODS

(75) Inventors: Kenji Kyuma, Soka (JP); Toshimichi Kudo, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/968,595

(22) Filed: Nov. 13, 1997

(65) Prior Publication Data

US 2003/0035053 A1 Feb. 20, 2003

(30) Foreign Application Priority Data

Nov. 15, 1996 (JP) .............................. 8-304672
Dec. 26, 1996 (JP) .............................. 8-347058

(51) Int. Cl.$^7$ .............................................. H04N 5/228
(52) U.S. Cl. ................................ 348/208.5; 348/208.99
(58) Field of Search ........................... 348/208, 208.99, 348/208.1, 208.2, 208.4, 208.5, 208.8, 208.7, 208.6; 396/52, 55, 53

(56) References Cited

U.S. PATENT DOCUMENTS

| 5,109,249 A | * | 4/1992 | Kitajima ................... 354/430 |
| 5,164,831 A | * | 11/1992 | Kuchta et al. ............. 358/209 |
| 5,345,264 A | * | 9/1994 | Murata et al. ............. 348/208 |
| 5,386,264 A | * | 1/1995 | Sekine et al. .............. 348/208 |
| 5,448,294 A | * | 9/1995 | Yamazaki ................... 348/208 |
| 5,497,192 A | * | 3/1996 | Ishizuka ..................... 348/208 |
| 5,502,484 A | * | 3/1996 | Okada ........................ 348/208 |
| 5,526,044 A | * | 6/1996 | Tokumitsu et al. ......... 348/208 |
| 5,734,441 A | * | 3/1998 | Kondo et al. ............... 348/208 |
| 5,737,018 A | * | 4/1998 | Shimizu et al. ............ 348/363 |
| 5,805,212 A | * | 9/1998 | Fujiwara .................... 348/208 |
| 5,867,213 A | * | 2/1999 | Ouchi ........................ 348/208 |
| 5,892,553 A | * | 4/1999 | Delmas ...................... 348/578 |
| 5,909,242 A | * | 6/1999 | Kobayashi et al. ......... 348/208 |
| 5,923,368 A | * | 7/1999 | Hirasawa ................... 348/208 |
| 5,926,212 A | * | 7/1999 | Kondo ........................ 348/208 |
| 5,982,421 A | * | 11/1999 | Inou et al. .................. 348/208 |
| 5,995,141 A | * | 11/1999 | Hieda ........................ 348/208 |
| 6,014,169 A | * | 1/2000 | Azusawa et al. ........... 348/208 |
| 6,169,574 B1 | * | 1/2001 | Noguchi et al. ............ 348/208 |
| 6,396,538 B1 | * | 5/2002 | Kobayashi et al. ......... 348/208 |

* cited by examiner

*Primary Examiner*—Wendy R. Garber
*Assistant Examiner*—Jacqueline Wilson
(74) *Attorney, Agent, or Firm*—Fitzpatrick, Cella, Harper & Scinto

(57) ABSTRACT

In a vibration correction apparatus for attaining vibration correction on the basis of motion information obtained by adding vibrations detected by an angular velocity sensor and vibrations detected from an image signal, the motion correction period based on the vibration information detected from the image signal is set to be shorter than the vibration detection period.

30 Claims, 14 Drawing Sheets

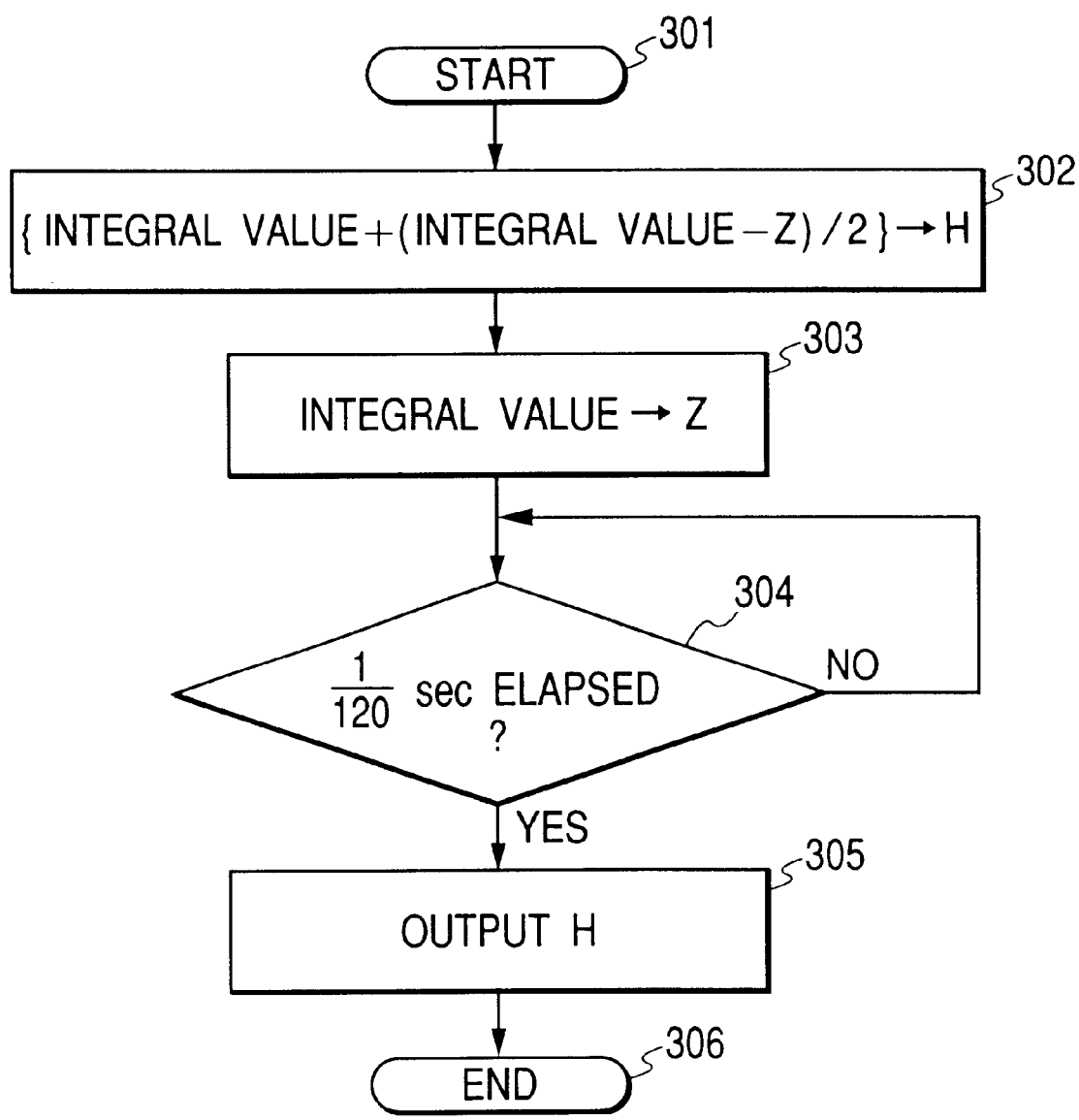

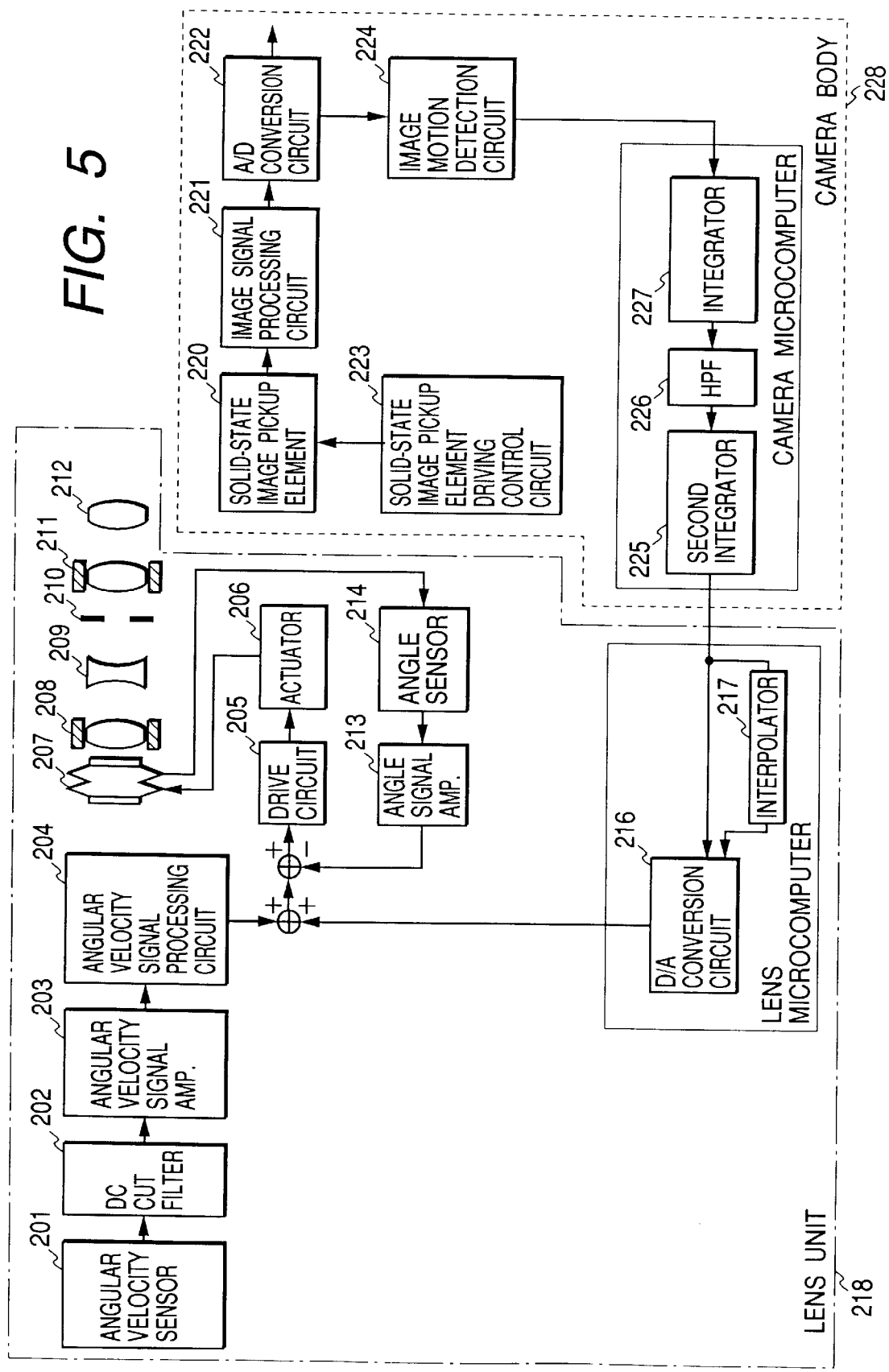

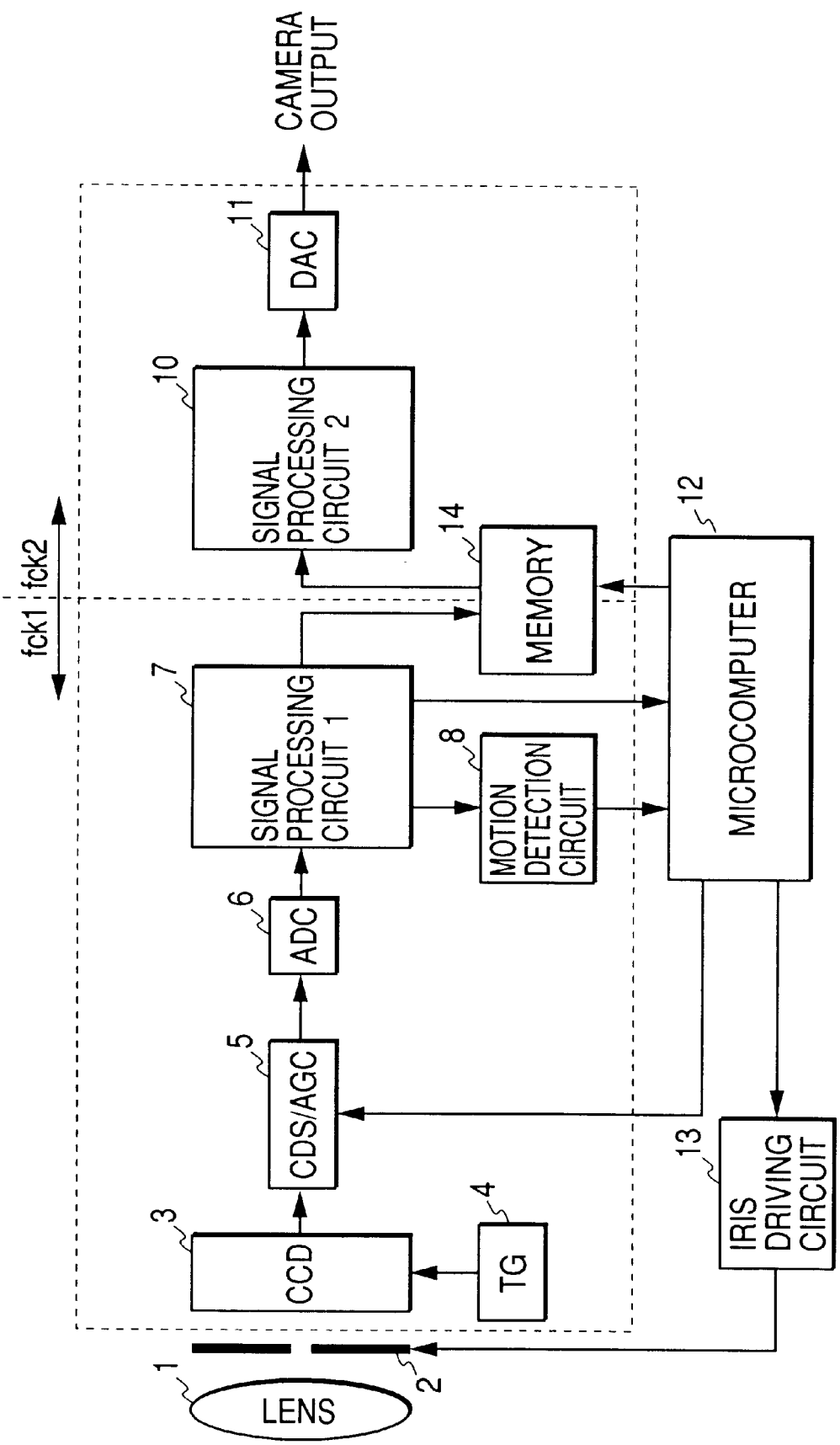

IMAGE PICKUP APPARATUS FOR STORING, READING-OUT AND PROCESSING A SIGNAL DURING PREDETERMINED TIME PERIODS

BACKGROUND OF THE INVENTION

1. Field of the Invention

The present invention relates to a vibration correction apparatus or image pickup apparatus having a vibration correction function of correcting camera shake, vibrations, and the like.

2. Related Background Art

In a compact video camera or the like, an object image is blurred due to camera shake, vibrations, and the like and is often not easy to see. In particular, since a recent video camera adopts a large-magnification lens, the image is considerably blurred at the telephoto side.

To solve this problem, many vibration correction apparatuses for correcting vibrations such as camera shake and the like have been proposed and are commercially available. As a vibration correction method using an optical system, a prior art that uses an angular velocity sensor as a vibration detection means, and a variable angle prism (VAP) as an image correction means is known. This prior art will be explained below.

The VAP will first be explained. As shown in FIG. 2, the VAP is made up of two opposing glass plates 21 and 22, bellows 23 and 24 that connect the two glass plates, and a high-refraction liquid 25 that fills a space closed by the bellows. Rotation shafts 26 and 27 are respectively provided to the glass plates 21 and 22.

In FIG. 2, when one glass plate 21 rotates by a about the rotation shaft 26, an incoming light beam 28 is deflected by φ owing to the same principle as a wedge prism. Likewise, the other glass plate 22 can rotate about the rotation shaft 27 and can deflect an incoming light beam 28.

The VAP with the above arrangement removes blurring of or stabilizes the object image by simultaneously controlling the two glass plates 21 and 22. In this example, upon filtering a signal output from the angular velocity sensor, the DC component is cut from that signal by a DC cut filter, and the signal is amplified by a predetermined amount for the purpose of camera shake correction. Thereafter, the signal is subjected to predetermined filtering to obtain a target value of the apex angle of the VAP. In accordance with this target value, the apex angle of the above-mentioned VAP is varied to attain camera shake correction.

However, the signal output from the angular velocity sensor has lower sensitivity as the frequency becomes lower, and its phase in the low-frequency band is not ideal as a result of signal processing. Hence, the user may feel poor effects in the low-frequency range especially at a large magnification.

Motion of images between fields is detected from the sensed image, and low-frequency range performance is improved by using the image motion information in addition to the above-mentioned VAP mechanism. However, since the sampling period of image motion detection is long, if the target value is updated at such long periods, the sensed image appears to have lower resolution.

SUMMARY OF THE INVENTION

The present invention has been made to solve the above-mentioned problems, and has as its first object to provide a vibration correction apparatus which is free from any resolution drop over the entire frequency range.

It is the second object of the present invention to optimize the characteristics of a vibration correction apparatus, which performs vibration detection and correction using both a physical sensor such as an angular velocity sensor and image motion information.

It is the third object of the present invention to provide a vibration detection and correction apparatus which has high correction effects for every vibration components ranging from lower to higher frequencies, and is free from any resolution drop.

In order to achieve the first to third objects, according to a preferred embodiment of the present invention, there is disclosed a camera comprising:

optical motion correction means for optically correcting motion of an image;

electronic motion correction means for electronically correcting the motion of the image;

electronic zoom means for electronically enlarging the image; and control means for, when the electronic zoom means is inactive, controlling to selectively operate the optical motion correction means and the electronic motion correction means, and for, when the electronic zoom means is active, controlling to operate both the optical motion correction means and the electronic motion correction means.

According to a preferred embodiment of the present invention, there is also disclosed an image pickup apparatus comprising:

vibration detection means for detecting vibration of a device;

motion detection means for detecting image motion from an image signal;

vibration correction means for correcting vibration of an image in accordance with one or both of output signals from the vibration detection means and the motion detection means;

signal processing means for calculating a correction target value to be supplied to the vibration correction means on the basis of a motion vector signal detected by the motion detection means; and sampling period varying means for setting a sampling period of the correction target value calculated by the signal processing means to be shorter than a sampling period of the motion vector signal.

It is the fourth object of the present invention to optimize the processing speed of the system.

In order to achieve the fourth object, according to a preferred embodiment of the present invention, there is disclosed an image pickup apparatus comprising:

an image pickup element;

rewritable storage means;

first signal processing means for processing a video signal from the image pickup element, and writing the processed video signal in the storage means at a first rate;

second signal processing means for reading out the video signal from the storage means at a second rate; and function control means for controlling a function associated with imaging on the basis of a signal from the first signal processing means, wherein the first rate is set to be higher than the second rate.

Other objects and features of the present invention will become apparent from the following description of the specification and the accompanying drawings.

BRIEF DESCRIPTION OF THE DRAWINGS

FIG. 3 is a flow chart for explaining the operation of an interpolation circuit in the first embodiment;

FIG. 5 is a block diagram showing the arrangement of an image pickup apparatus according to the second embodiment of the present invention;

FIG. 6 is a block diagram showing the arrangement according to the third embodiment of the present invention;

DETAILED DESCRIPTION OF THE PREFERRED EMBODIMENTS

The preferred embodiments of an image pickup apparatus and storage medium according to the present invention will be described hereinafter with reference to the accompanying drawings.

Figure 1:
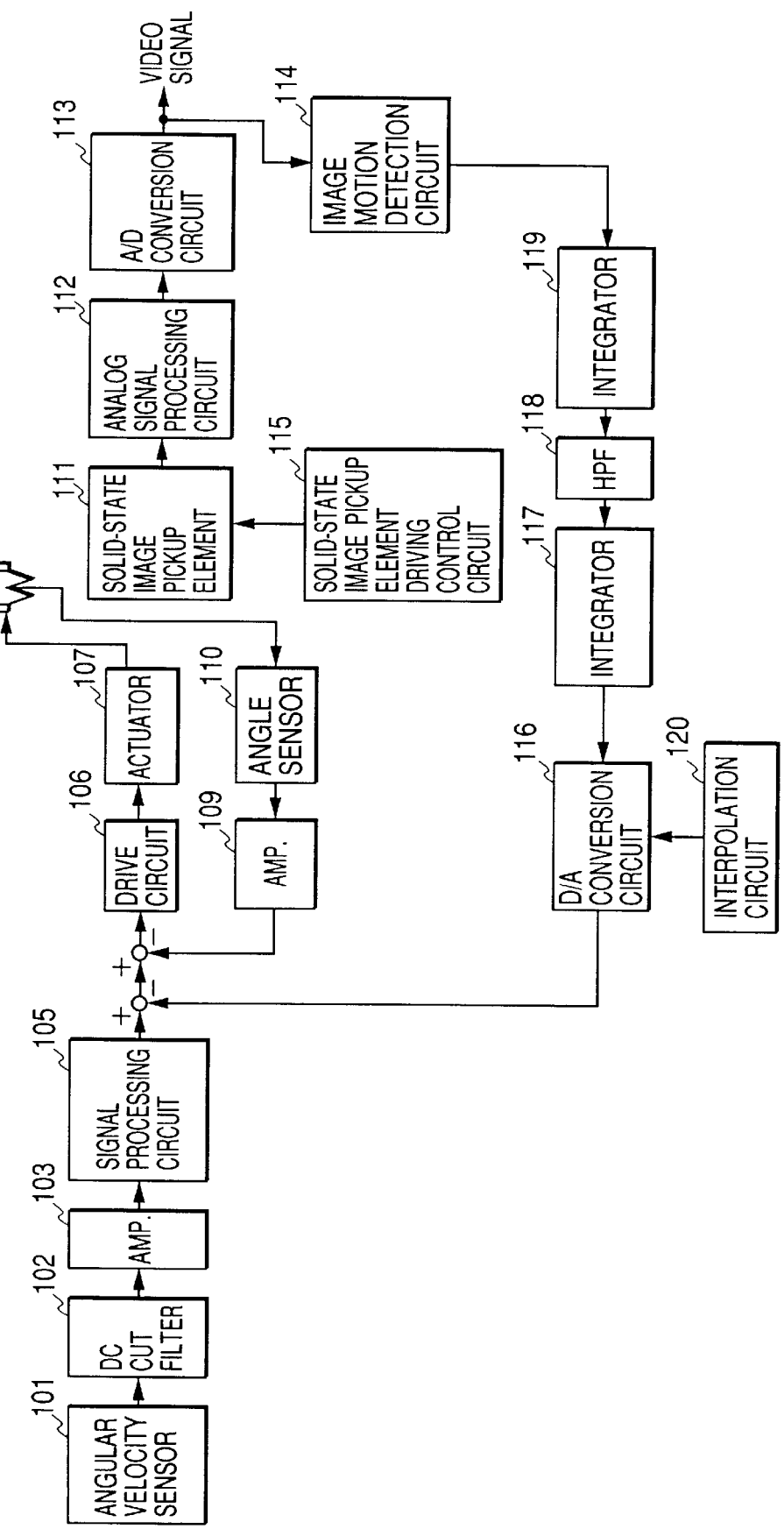
FIG. 1 is a block diagram showing the arrangement of an image pickup apparatus according to the first embodiment of the present invention.

FIG. 1 shows the arrangement according to the first embodiment of the present invention.

In FIG. 1, a signal output from an angular velocity sensor 101 for detecting vibrations is supplied to a DC cut filter 102 to cut its DC components, and thereafter, the signal is amplified to a predetermined level by an amplifier 103.

The amplified signal is supplied to a signal processing circuit 105 to execute signal processing required for calculating the first target value of the VAP apex angle.

On the other hand, a VAP unit 108 comprises an angle sensor 110 for detecting the apex angle, and the output from the angle sensor 110 is amplified by a predetermined amount by an amplifier 109.

The output from the amplifier 109 is subtracted from the first target value as the output from the signal processing circuit 105 to obtain a manipulated variable, which is input to a drive circuit 106. The drive circuit 106 drives an actuator 107 for varying the apex angle of a VAP in the VAP unit 108. With such series of operations, vibrations such as camera shake and the like are optically corrected.

However, in the above-mentioned operation, the output signal from the angular velocity sensor 101 has lower sensitivity as the frequency becomes lower, and its phase in the low-frequency band is not ideal as a result of signal processing. Hence, the user may feel poor vibration correction performance in the low-frequency range especially at a large magnification. This embodiment improves correction performance as follows.

More specifically, a motion detection method from an image signal is used in combination with the above-mentioned VAP unit. A solid-state image pickup element 111 converts an optical image obtained via an optical system into an electrical signal (to be referred to as a video signal hereinafter) under the control of a solid-state image pickup element driving control circuit 115. The video signal is subjected to predetermined signal processing in an analog signal processing circuit 112, and the processed video signal is then converted into a digital signal by an analog-to-digital (A/D) conversion circuit 113. The digital video signal is supplied to a recording system and finder system, and is also supplied to an image motion detection circuit 114 to be used for detecting an image motion vector indicating the amount of motion in the image between fields.

Using the image motion vector detected by the image motion detection circuit 114, the second target value of the VAP apex angle is calculated via an integrator 119, HPF 118, second integrator 117, and D/A conversion circuit 116. Note that the D/A conversion circuit 116 has a function of holding an output value until data is updated.

Since the image motion vector has higher detection performance in the low-frequency range than the angular velocity sensor, the detection performance in the low-frequency range is improved by adding the calculated second target value to the first target value.

At this time, since the sampling period of image motion detection is long (a frame generation period of 1/60 sec of a television signal), if the second target value is updated at such long periods, the image appears to have lower resolution. In view of this problem, in this embodiment, in case of the NTSC scheme, the second target value is added to the above-mentioned first target value at 120-Hz periods.

The interpolate value is calculated by an interpolation circuit 120.

The operation of the interpolation circuit 120 will be explained below with the aid of the flow chart in FIG. 3. Note that the NTSC scheme will be exemplified.

Since the image motion vector is obtained by detecting the motion between fields, the second integrator 117 makes 60 operations per sec. In response to the end timing of these operations as a trigger, processing 301 starts.

In processing 302, the previous integral value held in a memory Z is subtracted from the current integral value to obtain a difference, a value ½ the difference is added to the current integral value, and the sum is stored in a memory H. Note that the current integral value means the output value from the second integrator 117.

In processing 303, the integral value is stored in the memory Z. The value stored in the memory Z is used in the next operation.

In processing 304, it is checked if 1/120 sec have elapsed from processing 301. If 1/120 sec have elapsed, the flow advances to processing 305. Note that the interpolation circuit 120 has a counter function, and counts 1/120 sec using that function. Finally, in processing 305, the value in the memory H is output to the D/A conversion circuit 116.

The difference of changes in target value output from the D/A conversion circuit 116 in practice depending on the presence/absence of the above-mentioned interpolation circuit 120 will be explained below using FIGS. 4A and 4B.

Figure 4A:
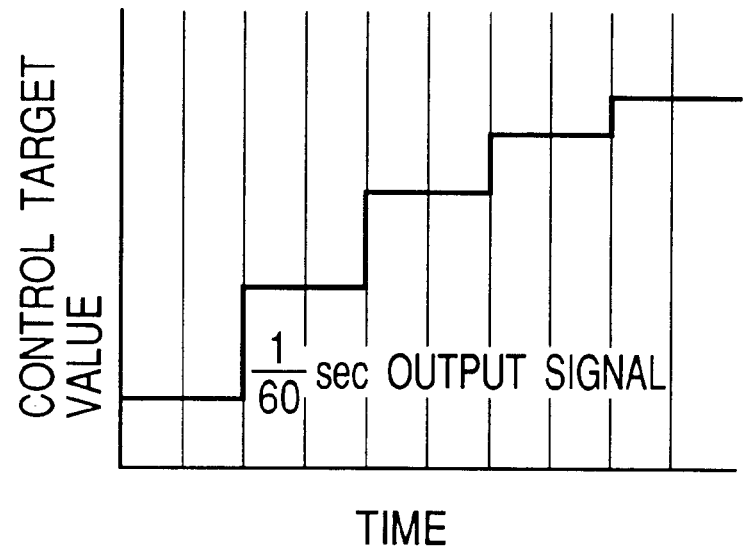
FIGS. 4A and 4B are graphs for explaining the operation of the interpolation circuit in the first embodiment.

FIG. 4A shows an example of the change timings of a target value when no interpolation circuit 120 is used, and one graduation on the time axis is 1/60 sec.

Figure 4B:
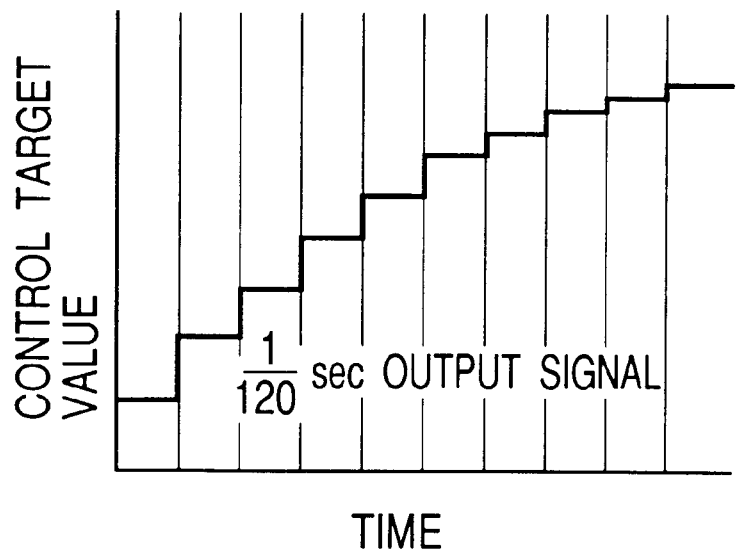

These timings change as shown in FIG. 4B owing to the effect of the interpolation circuit 120. One graduation on the time axis is 1/120 sec.

According to this embodiment, when a signal from a motion detection means is used in combination with an optical vibration correction function for, e.g., a camera shake to improve performance in the low-frequency range, a problem posed due to the long sampling period of the correction target value to be supplied to the VAP unit as a vibration correction means can be solved. Note that only one system of the correction function has been described, but there are two systems in the vertical and horizontal directions in practice.

FIG. 5 shows the arrangement of an image pickup apparatus according to the second embodiment of the present invention.

As shown in FIG. 5, the image pickup apparatus of this embodiment is constituted by a lens unit 218 and a camera body 228.

In the lens unit 218 shown in FIG. 5, a signal output from an angular velocity sensor 201 for detecting vibrations is supplied to a DC cut filter 202 to cut the DC component, and the signal is then amplified by a predetermined amount by an angular velocity signal amplifier 203.

The amplified signal is supplied to an angular velocity signal processing circuit 204 to execute signal processing required for calculating the first target value of the VAP apex angle.

On the other hand, a VAP unit 207 comprises an angle sensor 214 for detecting the apex angle, and the output from the angle sensor 214 is amplified by a predetermined amount by an angle signal amplifier 213.

The output from the angle signal amplifier 213 is subtracted from the first target value as the output from the angular velocity signal processing circuit 204 to obtain a manipulated variable, which is input to a drive circuit 205. The drive circuit 205 drives an actuator 206 for varying the apex angle of a VAP in accordance with the input manipulated variable. With this series of operations, vibrations are optically corrected.

However, the signal output from the angular velocity sensor 201 has lower sensitivity as the frequency becomes lower, and its phase in the low-frequency band is not ideal as a result of signal processing. Hence, the user may feel poor vibration correction performance in the low-frequency range especially at a large magnification.

A solid-state image pickup element 220 converts an optical image input via an optical system (208 to 212) into an electrical signal (to be referred to as a video signal hereinafter) under the control of a solid-state image pickup element driving control circuit 223. The video signal is subjected to predetermined signal processing in an image signal processing circuit 221, and the processed video signal is then converted into a digital signal by an analog-to-digital (A/D) conversion circuit 222.

The digital video signal is supplied to a recording system and finder system, and is also supplied to an image motion detection circuit 224 to detect an image motion vector indicating the amount of motion in the image between fields.

The image motion vector detected by the image motion detection circuit 224 is supplied to a lens microcomputer 215 in the lens unit 218 via an integrator 227, HPF 226, and second integrator 225, and the second target value of the VAP apex angle is calculated via a D/A conversion circuit 216 arranged there. Note that the D/A conversion circuit 216 has a function of holding an output value until data is updated.

The image motion vector has higher detection performance in the low-frequency range than the angular velocity sensor. However, since the sampling period of image motion detection is long, if the second target value is updated at such long periods by adding the second target value to the first target value, the image appears to have lower resolution. In view of this problem, in case of, e.g., the NTSC scheme, the second target value is added to the above-mentioned first target value at 120-Hz periods. The interpolated value is calculated by an interpolator 217.

The operation of the interpolator 217 and the difference of changes in target value output from the D/A conversion circuit 216 are as has been described in the first embodiment with the aid of FIGS. 4A and 4B, and a detailed description thereof will be omitted in the second embodiment.

Note that the present invention may be applied to either a system made up of a plurality of devices or an apparatus consisting of a single device. Also, the present invention can be applied to a case wherein the invention is achieved by supplying a program to the system or apparatus.

In this case, a storage medium that stores a program according to the present invention constitutes the present invention. By reading out the program from the storage medium to the system or apparatus, the system or apparatus operates by a predetermined method.

As described above, since the sampling period of a correction target value calculated by a signal processing means is set to be shorter than that of an image motion vector signal, when a signal from a motion detection means is also used to improve performance in the low-frequency range, a problem posed due to the long sampling time of the correction target value to be supplied to a vibration correction means can be solved, and vibration correction free from any resolution drop can be done.

In an image pickup apparatus in which a lens unit is detachable from a camera body, since a sampling period varying means for setting the sampling period of the correction target value to be shorter than that of the image motion vector signal is arranged in the lens unit, the sampling period can be easily and optimally converted in correspondence with the lens unit even when the lens unit is exchanged.

The third embodiment of the present invention will be described below.

This embodiment can efficiently process various functions such as AF, AE, AWB, and the like of an image pickup apparatus including a vibration correction means without requiring any high-speed, large-scape microcomputer, and can optimize processing as a whole system.

This embodiment will be explained in turn below.

Figure 11:
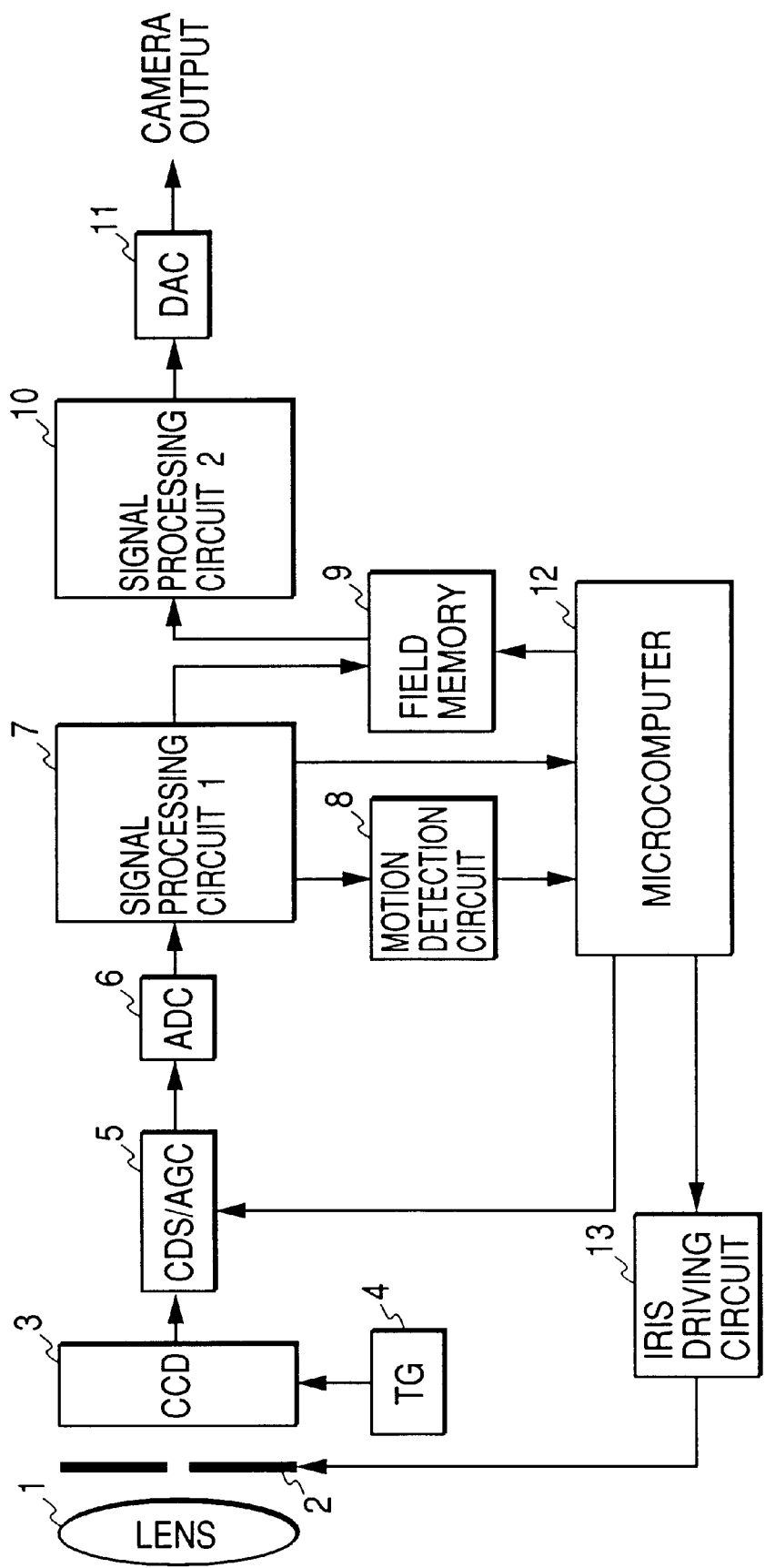
FIG. 11 is a block diagram showing the arrangement of an image pickup apparatus before the present invention.

FIG. 11 is a block diagram showing the arrangement of a conventional image pickup apparatus.

Figure 12:
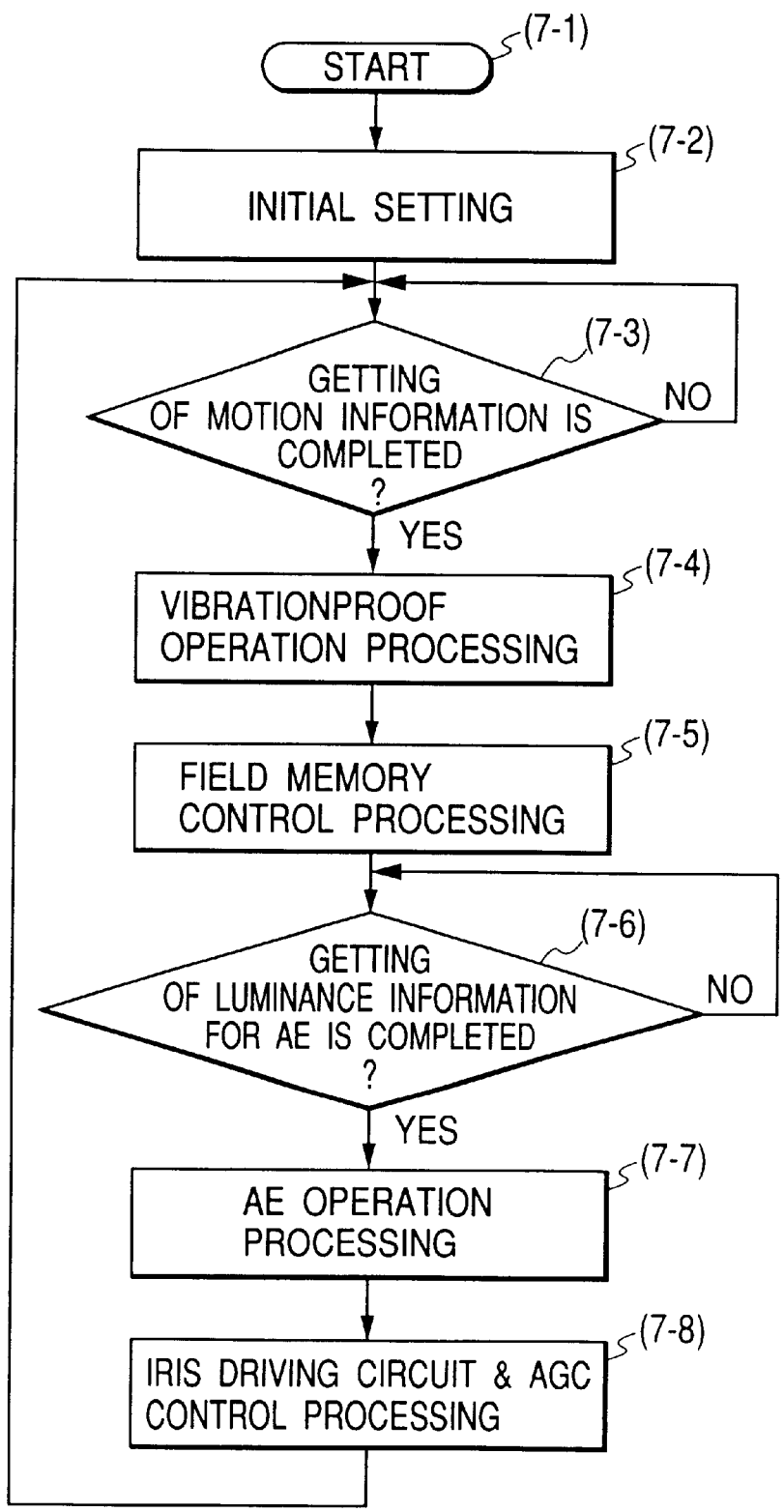
FIG. 12 is a flow chart showing the processing of a microcomputer of the apparatus shown in FIG. 11.

The apparatus shown in FIG. 11 comprises a lens 1, an iris 2, an image pickup element 3 such as a CCD, a timing pulse generator (to be abbreviated as a TG hereinafter) 4, a correlated double sampling and auto gain control circuit (to be abbreviated as a CDS/AGC circuit hereinafter) 5, an ADC (Analog to Digital Converter) 6 for converting an analog signal into a digital signal, a first signal processing circuit 7, a motion detection circuit 8, a field memory 9, a second signal processing circuit 10, a DAC (Digital to Analog Converter) 11, a microcomputer 12, and an iris driving circuit 13. The microcomputer 12 has a CPU and a memory required for the operation of the CPU, and the memory stores a CPU control sequence, as shown in FIG. 12.

In FIG. 11, light from an object enters the image pickup element 3 via the lens 1 and iris 2. The incoming light is photoelectrically converted by the image pickup element 3, which outputs a video signal to the CDS/AGC circuit 5 at a predetermined timing defined by the TG 4. The CDS/AGC circuit 5 executes known correlated double sampling to extract signal components from the output from the image pickup element 3, amplifies the signal by a gain designated by the microcomputer 12, and outputs the amplified signal to the ADC 6. The ADC 6 converts the input analog signal into a digital signal, and outputs the digital signal to the first signal processing circuit 7. The first signal processing circuit 7 performs chrominance signal generation, luminance signal generation, and the like, and outputs a motion detection luminance signal to the motion detection circuit 8. Also, the circuit 7 outputs AE control luminance information to the microcomputer 12, and outputs luminance and chrominance signals to the field memory 9.

The motion detection circuit 8 detects image motion information by a known pattern matching technique and the like using the motion detection luminance signal input from the first signal processing circuit 7, and supplies that information to the microcomputer 12. The microcomputer 12 estimates the camera shake direction and amount produced upon imaging by a photographer on the basis of the image motion information obtained by the motion detection circuit 8, and corrects camera shake by changing the read positions of the luminance and chrominance signals input to the field memory 9 on the basis of the estimated values. Furthermore, the microcomputer 12 compares the AE control luminance information obtained by the first signal processing circuit 7 with a predetermined reference level, and controls the gain of the CDS/AGC circuit 5 on the basis of that comparison result. Also, the microcomputer 12 controls the iris 2 via the iris driving circuit 13 so that the AE control luminance information matches the reference level.

The second signal processing circuit 10 performs enlargement processing and other predetermined processing of the luminance and chrominance signals output from the field memory 9 in correspondence with the camera shake correction, and outputs the processed signals to the DAC 11. The DAC 11 converts the digital luminance and chrominance signals obtained from the second signal processing circuit 10 into analog signals, and outputs them to a VTR, and the like.

FIG. 12 is a schematic flow chart of the processing of the microcomputer 12 in FIG. 11. FIG. 12 will be described in turn below.

The processing flow starts from step (7-1), and then advances to step (7-2). In step (7-2), predetermined initial setting is done, and the flow advances to step (7-3). In step (7-3), it is checked if getting of motion information from the motion detection circuit 8 in FIG. 11 is completed. If YES in step (7-3), the flow advances to step (7-4); otherwise, the flow returns to step (7-3).

In step (7-4), the motion information is operated to estimate the camera shake direction and amount, and the flow then advances to step (7-5). In step (7-5), an operation for changing the read positions of luminance and chrominance signals input to the field memory 9 is done on the basis of the camera shake direction and amount estimated in step (7-4), and the field memory 9 is controlled to read out the luminance and chrominance signals at predetermined timings from the read positions based on the operation result. Thereafter, the flow advances to step (7-6). In step (7-6), it is checked if getting of AE control luminance information from the first signal processing circuit 7 is completed. If YES in step (7-6), the flow advances to step (7-7); otherwise, the flow returns to step (7-6). In step (7-7), the AE control luminance information is compared with the predetermined reference level, and the flow advances to step (7-8). In step (7-8), the gain of the CDS/AGC circuit 5 is controlled on the basis of the comparison result in step (7-7), and a control signal is output to the iris driving circuit 13 to control the iris 2. Thereafter, the flow returns to step (7-3).

FIGS. 13A to 13E are timing charts for explaining the vibrationproof and AE processing timings of the system shown in FIG. 11. In an actual circuit, signals are delayed in the respective units, but such delays are ignored in FIGS. 13A to 13E for the sake of simplicity. FIGS. 13A to 13E will be described below.

Figure 13:
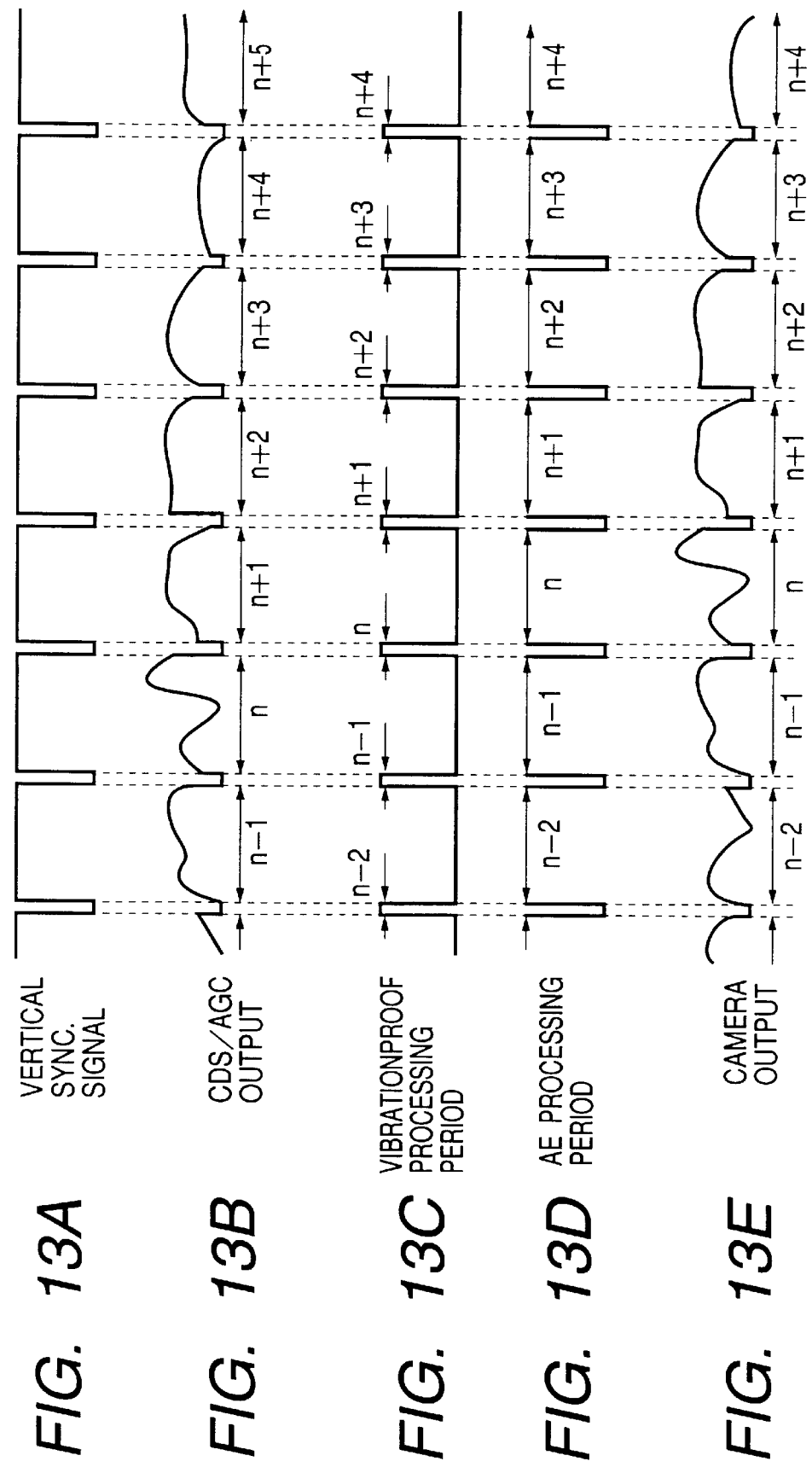
FIGS. 13A, 13B, 13C, 13D and 13E are timing charts showing the processing timings of the microcomputer shown in FIG. 12.

FIG. 13A shows a vertical sync. signal (active low), FIG. 13B the output signal from the CDS/AGC circuit 5, FIG. 13C the vibrationproof processing period of the microcomputer 12, FIG. 13D the AE processing period of the microcomputer 12, and FIG. 13E the output signal from the DAC 11. The following explanation will be given paying attention to period n (a period excluding the vertical sync. period in one field period) in FIG. 13B.

The CDS/AGC output signal in period n in FIG. 13B is input to the motion detection circuit 8 and field memory 9 via the ADC 6 and first signal processing circuit 7. After all motion detection luminance signal components corresponding to period n in FIG. 13B are input, the motion detection circuit 8 starts motion detection processing, and supplies motion detection information to the microcomputer 12. The microcomputer 12 executes processing in steps (7-3) to (7-5) in FIG. 12 during period n in FIG. 13C, i.e., the vertical sync. period immediately after period n in FIG. 13B. With such processing, a signal during period n in FIG. 13E is obtained.

On the other hand, the first signal processing circuit 7 can supply AE control luminance information during period n in FIG. 13B to the microcomputer 12 a while after the end of period n in FIG. 13B. The microcomputer 12 executes processing in steps (7-6) to (7-8) in FIG. 12 during period n in FIG. 13D.

However, in the above-mentioned example, since the vibrationproof processing period of the microcomputer 12 is limited to a very short vertical sync. period, as shown in FIG. 13C, the microcomputer 12 must have high processing speed. This results in an increase in cost. Also, as shown in FIG. 13D, since the AE processing period substantially becomes the next field period, extra measures must be taken in design of AE control.

Hence, the object of this embodiment is to provide an image pickup apparatus which solves the above-mentioned problems.

In order to achieve the above object, according to this embodiment, an image pickup apparatus comprises:

an image pickup element;

rewritable storage means;
first signal processing means for processing a video signal from the image pickup element, and writing the processed video signal in the storage means at a first rate;
second signal processing means for reading out the video signal from the storage means at a second rate; and
function control means for controlling a function associated with imaging on the basis of a signal from the first signal processing means, and
the first rate is set to be higher than the second rate.

The function control means comprises vibration correction means for an image picked up by the image pickup element.

Furthermore, the function control means may comprise automatic exposure correction means for the image pickup element.

Moreover, the function control means may comprise automatic focus correction means in the image pickup element.

In addition, the function correction means may comprise automatic white balance correction means for the video signal from the image pickup element.

Further, the first rate may be set to be twice or more higher than the second rate.

Also, there is disclosed an image pickup apparatus comprising:
an image pickup element;
rewritable storage means;
means for simultaneously reading out video signal components for two lines from the image pickup element;
first signal processing means for processing the simultaneously readout video signal components for two lines, and writing the processed video signal components in the storage means;
second signal processing means for reading out the video signal from the storage means; and
function control means for controlling a function associated with imaging on the basis of a signal from the first signal processing means.

The function control means may comprise vibration correction means for an image picked up by the image pickup element, automatic exposure correction means, automatic focus correction means, or automatic white balance correction means.

FIG. 6 is a block diagram for explaining the third embodiment of the present invention, and the same reference numerals in FIG. 6 denote parts having equivalent functions to those shown in FIG. 11.

Figure 7:
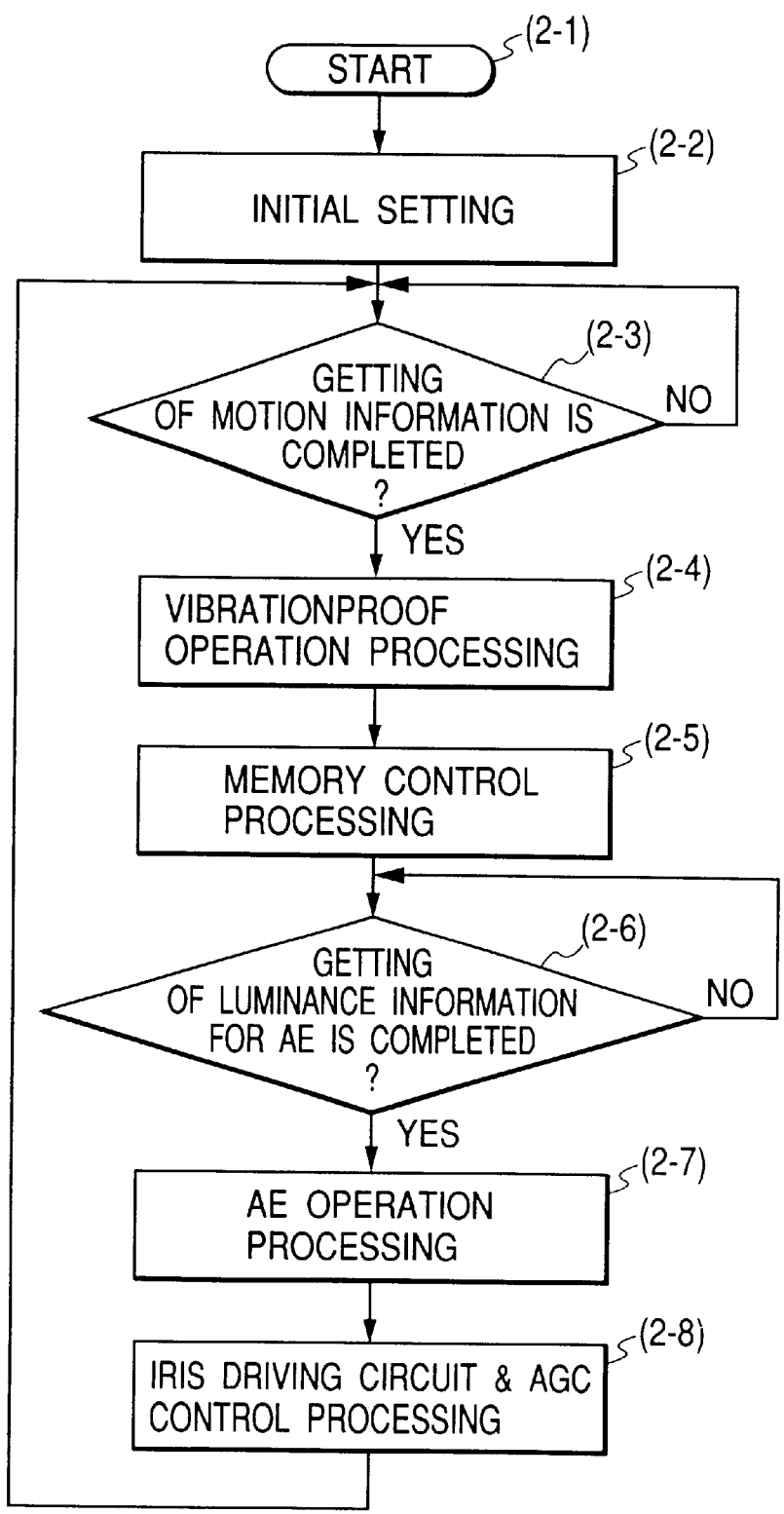
FIG. 7 is a flow chart showing the processing of a microcomputer in the third embodiment of the present invention.

A memory 14 has a larger capacity than the field memory 9 shown in FIG. 11, and appropriately selects its capacity in accordance with frequencies fck1 and fck2 in FIG. 6. A memory in the microcomputer 12 stores a CPU control sequence, as shown in FIG. 7.

The third embodiment of the present invention will be described below with reference to FIG. 6.

In FIG. 6, light from an object enters the image pickup element 3 via the lens 1 and iris 2. The image pickup element 3 photoelectrically converts the incoming light, and outputs a video signal to the CDS/AGC circuit 5 in response to a predetermined timing defined by the TG 4, which operates based on a frequency fck1. The CDS/AGC circuit 5 executes known correlated double sampling on the basis of the frequency fck1 to extract signal components from the output from the image pickup element 3, amplifies the signal by a gain designated by the microcomputer 12, and outputs the amplified signal to the ADC 6. The ADC 6 converts the input analog signal into a digital signal on the basis of the frequency fck1, and outputs the digital signal to the first signal processing circuit 7. The first signal processing circuit 7 performs chrominance signal generation, luminance signal generation, and the like on the basis of the frequency fck1, and outputs a motion detection luminance signal to the motion detection circuit 8. Also, the circuit 7 outputs AE control luminance information to the microcomputer 12, and outputs luminance and chrominance signals to the memory 14.

The motion detection circuit 8 detects image motion information by a known pattern matching technique and the like using the motion detection luminance signal input from the first signal processing circuit 7, and supplies that information to the microcomputer 12. The microcomputer 12 estimates the camera shake direction and amount produced upon imaging by a photographer on the basis of the image motion information obtained by the motion detection circuit 8, and corrects camera shake by changing the read positions of the luminance and chrominance signals input to the memory 14 on the basis of the estimated values. Furthermore, the microcomputer 12 compares the AE control luminance information obtained by the first signal processing circuit 7 with a predetermined reference level, and controls the gain of the CDS/AGC circuit 5 on the basis of that comparison result. Also, the microcomputer 12 controls the iris 2 via the iris driving circuit 13 so that the AE control luminance information matches the reference level.

The second signal processing circuit 10 performs enlargement processing and other predetermined processing of the luminance and chrominance signals output from the memory 14 in correspondence with the camera shake correction on the basis of a frequency fck2, and outputs the processed signals to the DAC 11. The DAC 11 converts the digital luminance and chrominance signals obtained from the second signal processing circuit 10 into analog signals on the basis of the frequency fck2, and outputs them to a VTR, and the like.

FIG. 7 is a schematic flow chart showing the processing of the microcomputer 12 in the third embodiment of the present invention. FIG. 7 will be described in turn below.

The processing flow starts from step (2-1), and then advances to step (2-2). In step (2-2), predetermined initial setting is done, and the flow advances to step (2-3). In step (2-3), it is checked if getting of motion information from the motion detection circuit 8 is completed. If YES in step (2-3), the flow advances to step (2-4); otherwise, the flow returns to step (2-3). In step (2-4), the motion information is operated to estimate the camera shake direction and amount, and the flow then advances to step (2-5). In step (2-5), an operation for changing the read positions of luminance and chrominance signals input to the memory 14 is done on the basis of the camera shake direction and amount estimated in step (2-4), and the memory 14 is controlled to read out the luminance and chrominance signals at predetermined timings from the read positions based on the operation result. Thereafter, the flow advances to step (2-6). In step (2-6), it is checked if getting of AE control luminance information from the first signal processing circuit 7 is completed. If YES in step (2-6), the flow advances to step (2-7); otherwise, the flow returns to step (2-6). In step (2-7), the AE control luminance information is compared with the predetermined reference level, and the flow advances to step (2-8). In step (2-8), the gain of the CDS/AGC circuit 5 is controlled on the basis of the comparison result in step (2-7), and a control signal is output to the iris driving circuit 13 to control the iris 2. Thereafter, the flow returns to step (2-3).

FIGS. 8A to 8D are timing charts for explaining the vibrationproof and AE processing timings when the frequency fck1 is set about twice as high as the frequency fck2 in the third embodiment of the present invention. In an actual circuit, signals are delayed in the respective units, but such delays are ignored in FIGS. 8A to 8D for the sake of simplicity. FIGS. 8A to 8D will be described below.

Figure 8:
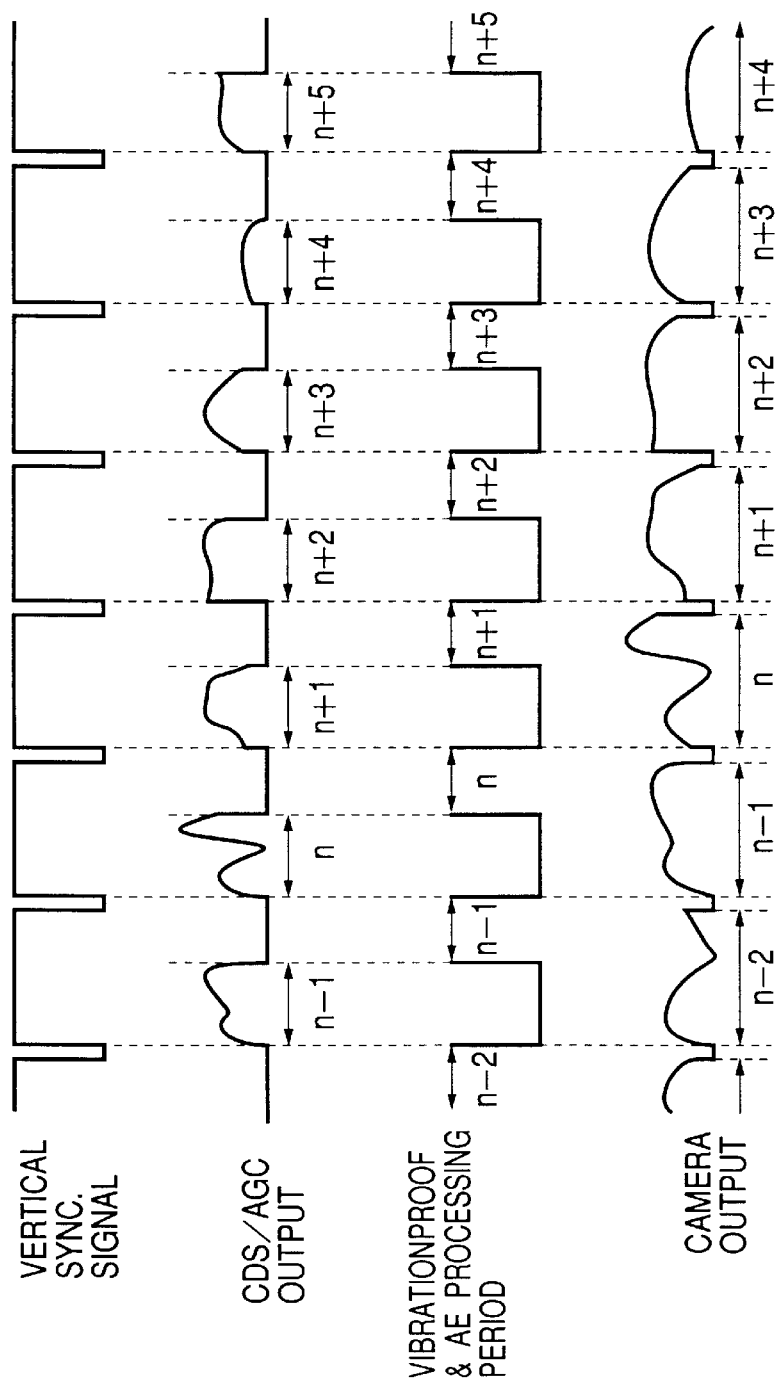
FIGS. 8A, 8B, 8C and 8D are timing charts showing the processing timings of the microcomputer in the third embodiment of the present invention.

FIG. 8A shows a vertical sync. signal (active low), FIG. 8B the output signal from the CDS/AGC circuit 5, FIG. 8C the vibrationproof processing and AE processing period of the microcomputer 12, and FIG. 8D the output signal from the DAC 11. The following explanation will be given paying attention to period n in FIG. 8B.

Since the image pickup element 3, TG 4, and CDS/AGC circuit 5 operate based on the frequency fck1 higher than about twice the frequency fck2 as the final operation frequency of the system of the third embodiment, period n in FIG. 8B is half (former half of one field) that in the above-mentioned example (FIGS. 13A to 13E). The CDS/AGC output signal during period n in FIG. 8B is input to the motion detection circuit 8 and memory 14 via the ADC 6 and the first signal processing circuit 7. Note that the first signal processing circuit 7, motion detection circuit 8, and memory 14 operate on the basis of the frequency fck1. After all motion detection luminance signal components corresponding to period n in FIG. 8B are input, the motion detection circuit 8 starts motion detection processing, and supplies motion detection information to the microcomputer 12. The microcomputer 12 executes processing in steps (2-3) to (2-5) in FIG. 7 during period n in FIG. 8C, i.e., the latter half of the same field as period n in FIG. 8B. With such processing, a signal during period n in FIG. 8D is obtained. On the other hand, the first signal processing circuit 7 can supply AE control luminance information during period n in FIG. 8B to the microcomputer 12 for a while after the end of period n in FIG. 8B. The microcomputer 12 can execute processing in steps (2-6) to (2-8) in FIG. 7 during period n in FIG. 8C after the vibrationproof processing.

With this processing, operations and processing for vibration correction and the like can be optimized without changing the normal television scheme.

Figure 9:
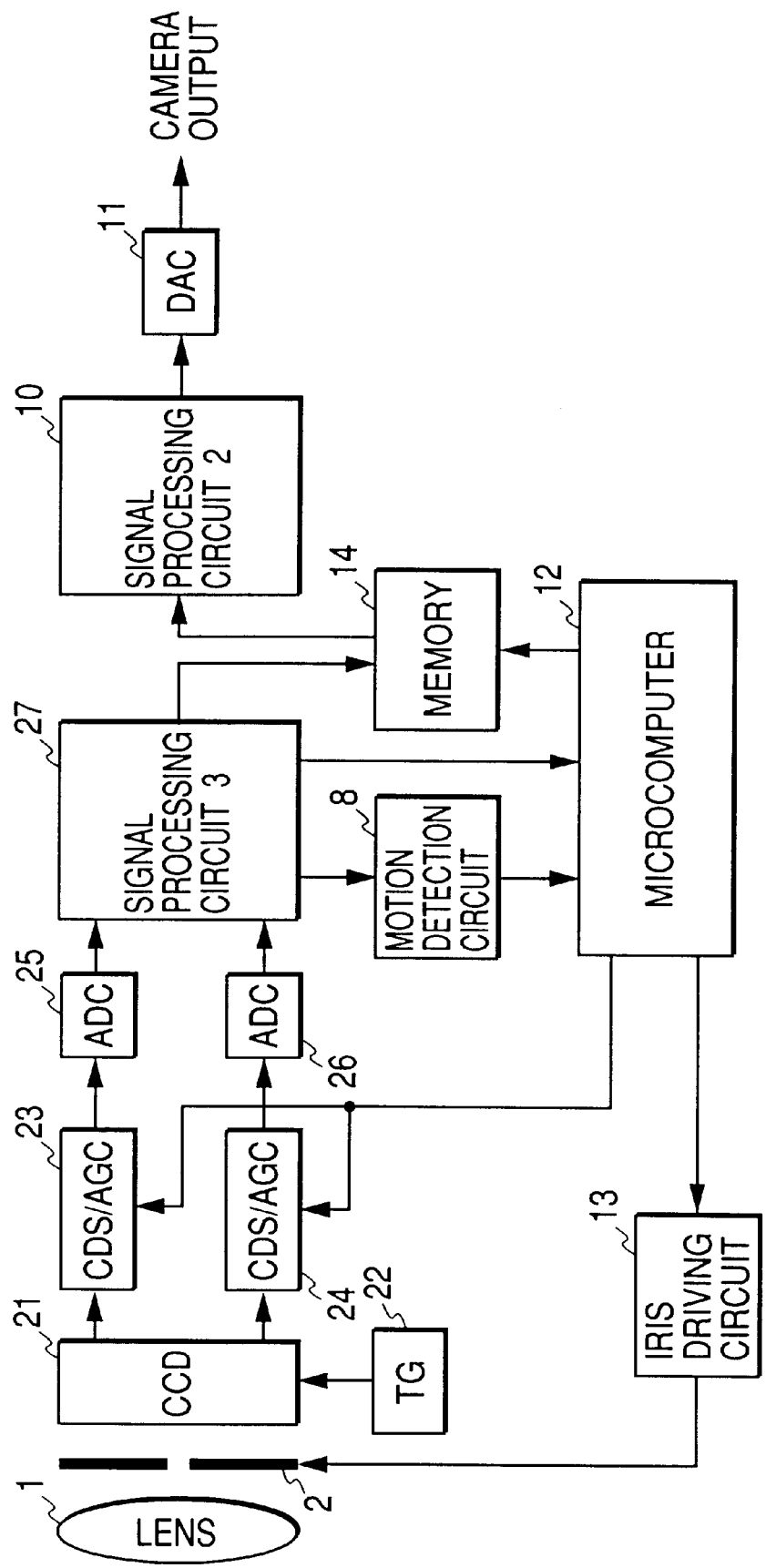
FIG. 9 is a block diagram showing the arrangement according to the fourth embodiment of the present invention.

FIG. 9 is a block diagram for explaining the fourth embodiment of the present invention, and the same reference numerals in FIG. 9 denote parts having equivalent functions to those shown in FIG. 6. In FIG. 9, a 2-line read image pickup element 21 such as a 2-line read CCD is driven by a timing pulse generator (to be abbreviated as a TG hereinafter) 22. The image pickup element 21 is connected to correlated double sampling and auto gain control circuits (to be abbreviated as CDS/AGC circuits hereinafter) 23 and 24, which are connected to a third signal processing circuit 27 via ADCs (Analog to Digital Converters) 25 and 26.

The fourth embodiment will be described below with reference to FIG. 9.

In FIG. 9, light from an object enters the image pickup element 21 via the lens 1 and iris 2. The image pickup element 21 photoelectrically converts the incoming light, and outputs a video signal to the CDS/AGC circuits 23 and 24 in units of two lines in response to a predetermined timing defined by the TG 22. The CDS/AGC circuits 23 and 24 execute known correlated double sampling to extract signal components from the output from the image pickup element 21, amplify the input signals by a gain designated by the microcomputer 12, and output the amplified signals to the ADCs 25 and 26. The ADCs 25 and 26 convert the input analog signals into digital signals, and output them to the third signal processing circuit 27. The third signal processing circuit 27 performs chrominance signal generation, luminance signal generation, and the like on the basis of signals in units of two lines, and outputs a motion detection luminance signal to the motion detection circuit 8. Also, the circuit 27 outputs AE control luminance information to the microcomputer 12, and outputs luminance and chrominance signals to the memory 14. The motion detection circuit 8 detects image motion information by a known pattern matching technique and the like using the motion detection luminance signal input from the third signal processing circuit 27, and supplies that information to the microcomputer 12. The microcomputer 12 estimates the camera shake direction and amount produced upon imaging by a photographer on the basis of the image motion information obtained by the motion detection circuit 8, and corrects camera shake by changing the read positions of the luminance and chrominance signals input to the memory 14 on the basis of the estimated values. Furthermore, the microcomputer 12 compares the AE control luminance information obtained by the third signal processing circuit 27 with a predetermined reference level, and controls the gain of the CDS/AGC circuits 23 and 24 on the basis of that comparison result. Also, the microcomputer 12 controls the iris 2 via the iris driving circuit 13 so that the AE control luminance information matches the reference level. The second signal processing circuit 10 performs enlargement processing and other predetermined processing of the luminance and chrominance signals output from the memory 14 in correspondence with the camera shake correction, and outputs the processed signals to the DAC 11. The DAC 11 converts the digital luminance and chrominance signals obtained from the second signal processing circuit 10 into analog signals, and outputs them to a VTR, and the like.

The processing flow of the microcomputer 12 of this embodiment is the same as that shown in FIG. 7.

FIGS. 10A to 10E are timing charts for explaining the vibrationproof and AE processing timings in the fourth embodiment. In an actual circuit, signals are delayed in the respective units, but such delays are ignored in FIGS. 10A to 10E for the sake of simplicity. FIGS. 10A to 10E will be described below.

Figure 10:
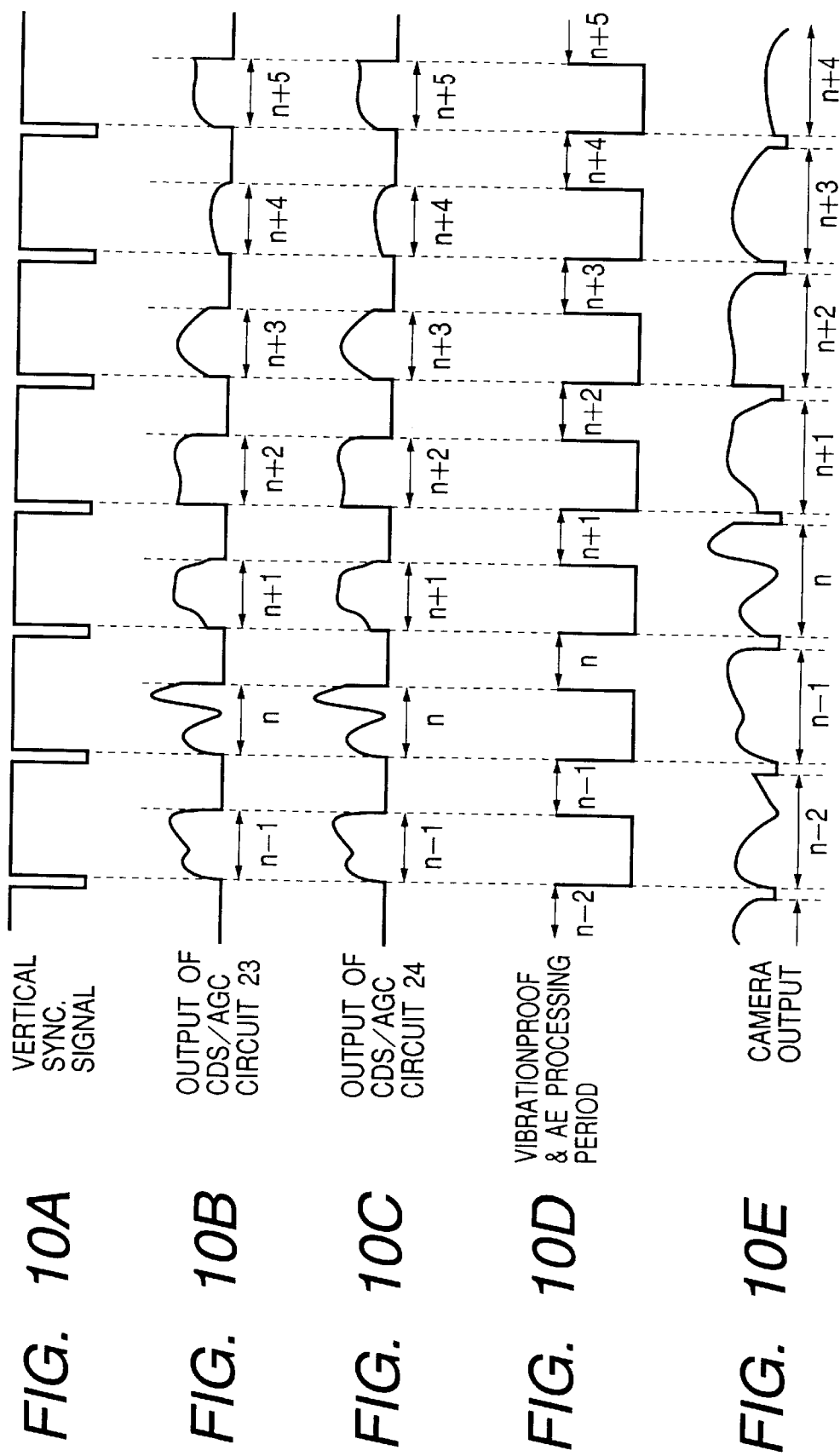
FIGS. 10A, 10B, 10C, 10D and 10E are timing charts showing the processing timings of a microcomputer in the fourth embodiment of the present invention.

FIG. 10A shows a vertical sync. signal (active low), FIG. 10B the output signal from the CDS/AGC circuit 23, FIG. 10C the output signal from the CDS/AGC circuit 24, FIG. 10D the vibrationproof and AE processing period of the microcomputer 12, and FIG. 10E the output signal from the DAC 11. The following explanation will be given paying attention to period n in FIGS. 10B and 10C.

Since signal components for two lines are simultaneously read out from the image pickup element 21 and the CDS/AGC circuits 23 and 24 respectively process the signal components of the corresponding lines, period n in FIGS. 10B and 10C is half (former half of one field) that in the above-mentioned example (FIGS. 13A to 13E). The CDS/AGC output signals for two lines during period n in FIGS. 10B and 10C are input to the third signal processing circuit 27 respectively via the ADCs 25 and 26, and are appropriately processed. The output signal from the third signal processing circuit 27 is input to the motion detection circuit 8 and the memory 14. After all motion detection luminance signal components corresponding to period n in FIGS. 10B and 10C are input, the motion detection circuit 8 starts motion detection processing, and supplies motion detection information to the microcomputer 12. The microcomputer 12 executes processing in steps (2-3) to (2-5) in FIG. 7 during period n in FIG. 10D, i.e., the latter half of the same field as period n in FIGS. 10B and 10C. With such processing, a signal during period n in FIG. 10E is obtained. On the other hand, the third signal processing circuit 27 can supply AE control luminance information during period n in FIGS. 10B and 10C to the microcomputer 12 a while after the end of period n in FIGS. 10B and 10C. The microcomputer 12 can execute processing in steps (2-6) to (2-8) in FIG. 7 during period n in FIG. 10C after the vibrationproof processing.

Note that this embodiment has described camera shake correction and AE control, but can also be easily applied to imaging functions such as AF (auto focus correction), AWB (auto white balance correction), and the like using image information.

As described above, according to the above-mentioned embodiments, since information required for functions associated with imaging such as vibration correction, AE, AF, AWB, and the like can be obtained earlier than the prior art example shown in FIG. 11, the processing speed for executing such functions need not be so high, cost can be reduced, and the need for any extra considerations in design of imaging functions can be obviated.

The fifth embodiment of the present invention will be described below.

This embodiment aims at optimizing control in a system comprising optical vibration correction, electronic vibration correction, and electronic zoom means. The fifth embodiment will be described below.

In a compact video camera or the like, an object image is blurred due to camera shake, vibrations, and the like and is often not easy to see. In particular, since a recent video camera adopts a large-magnification lens, the image is considerably blurred at the telephoto side.

Many vibration correction apparatuses for correcting vibrations such as camera shake and the like have been proposed and are commercially available.

As a vibration correction apparatus using an optical system, an example that uses an angular velocity sensor as a vibration detection means, and a VAP as an image correction means is known. In this example, upon filtering a signal output from the angular velocity sensor, the DC component is cut from that signal by a DC cut filter, and the signal is amplified by an amount required for camera shake correction. Thereafter, the signal is subjected to required signal processing to obtain a target value of the apex angle of the VAP.

In accordance with this target value, the apex angle of the above-mentioned VAP is varied to attain camera shake correction.

However, the conventional vibration correction apparatus suffers the following problems. In the conventional optical vibration correction apparatus, the angular velocity sensor has lower sensitivity in the low-frequency range in terms of its characteristics. However, the current optical system technique has advanced remarkably, and zoom lenses tend to have higher zoom ratios. Furthermore, in an electronic zoom region for extracting an image input via the optical telephoto end and electronically enlarging the extracted image, since the angular velocity sensor has low sensitivity in the low-frequency region, vibration correction in the low-frequency range has low precision.

In order to solve the above-mentioned problem, in this embodiment, in an optical vibration correction apparatus, by moving the read positions from a storage circuit in accordance with motion detected by an image motion detection circuit in the remaining portion after an image to be read out is subtracted in only the electronic zoom region, a vibration correction apparatus which can remove low-frequency vibrations with high precision without deteriorating image quality can be obtained.

The fifth embodiment will be described below.

Figure 2:
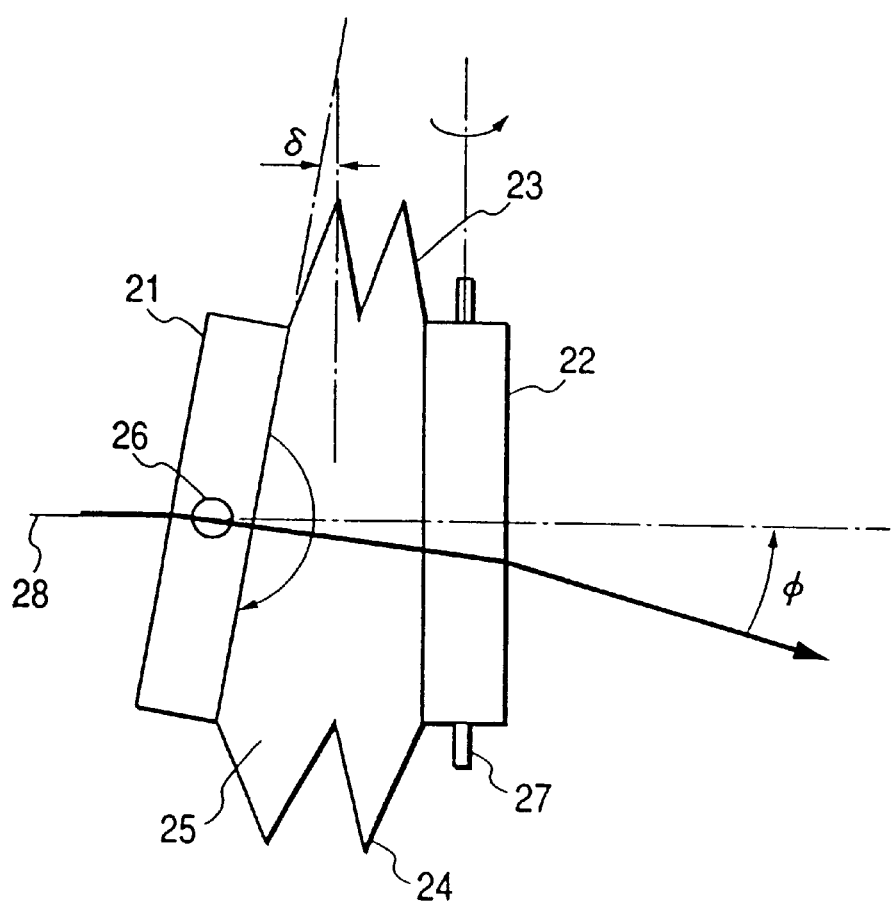
FIG. 2 is an explanatory view of the arrangement and operation of a VAP.

Since the VAP has already been described previously with the aid of FIG. 2, a detailed description thereof will be omitted.

Figure 14:
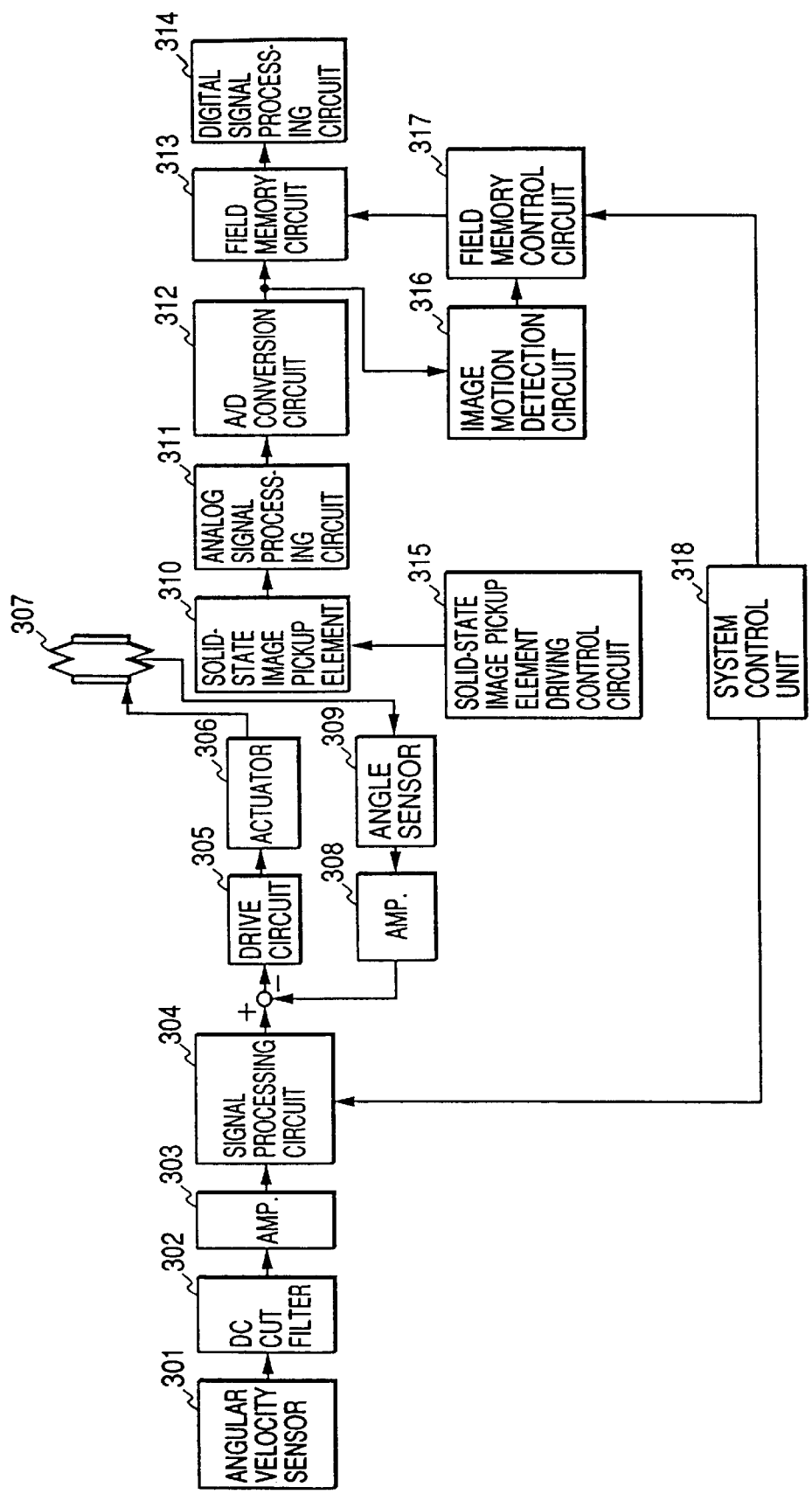
FIG. 14 is a block diagram showing the arrangement according to the fifth embodiment of the present invention.

FIG. 14 shows the arrangement of a camera shake correction apparatus according to the fifth embodiment.

Note that the camera shake correction apparatus of this embodiment has members 301 to 306, 308, and 309 of the arrangement shown in FIG. 14 for two systems independently in the pitch (vertical) and yaw (horizontal directions).

In FIG. 14, a signal output from an angular velocity sensor 301 for detecting vibrations is input to a DC cut filter 302 to cut the DC component, and the signal is then amplified by an amplifier 303 as needed. A signal processing circuit 304 executes signal processing required for generating a target value of the VAP apex angle on the basis of the amplified signal.

On the other hand, a VAP unit 307 includes an angle sensor 309 for detecting the apex angle, and the output from the sensor 309 is amplified by an amplifier 308 as needed.

The difference between the outputs from the signal processing circuit 304 and the amplifier 308 is calculated to obtain a manipulated variable, which is output to a drive circuit 305. The drive circuit 305 drives based on the input manipulated variable an actuator 306 for varying the apex angle of the VAP In the VAP unit 307. A series of operations mentioned above optically correct vibrations.

A system control unit 318 makes ON/OFF-control of camera shake correction, and panning control (when it is determined that the photographer intentionally pans or tilts the camera), and controls the signal processing circuit 304 for the purpose of the control executed when the camera is set on a stable place such as a tripod. Note that the signal processing circuit 304 may be implemented by software on a microcomputer.

A solid-state image pickup element 310 converts an optical image input via an optical system into an electrical signal (to be referred to as a video signal hereinafter). The video signal is processed by an analog signal processing circuit 311, and the processed signal is converted into a digital signal by an analog-to-digital conversion circuit (to be referred to as an A/D conversion circuit) 312. The digital video signal is stored in a field memory circuit 313. The digital video signal is also supplied to an image motion detection circuit 316 and is used for detecting image motion. Upon receiving an electronic zoom (enlargement) processing command from the system control unit 318, a field memory control circuit 317 controls the field memory circuit 313 to enlarge the stored image in accordance with a zoom ratio included in the command. At this time, the read position can be moved within a region that remains after the image to be read out by the field memory control circuit 317 is subtracted from the image stored in the field memory circuit 313. Upon receiving a vibration correction ON command from the system control unit 318, the field memory control circuit 317 moves the read address within that movable range in accordance with a signal from the image motion detection circuit 316, thus attaining vibration correction. The image read out from the field memory circuit 313 is interpolated by a digital signal processing circuit 314 in correspondence with a desired broadcasting scheme. As described above, since the electronic vibrationproof function with excellent low-frequency characteristics is used together with the optical vibrationproof function only during electronic zooming, a camcorder which is easy for the photographer to operate can be provided.

According to this embodiment, a vibration correction apparatus that can attain vibration correction, which is free from any deterioration of image quality caused by vibration correction, and can remove low-frequency vibrations, as a problem of an optical vibration correction apparatus, with high precision in the electronic zoom region, can be realized.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image pickup apparatus comprising:

vibration detection means for detecting vibration of a device;

motion detection means for detecting image motion from an image signal;

vibration correction means for correcting vibration of an image in accordance with one or both of output signals from said vibration detection means and said motion detection means;

signal processing means for calculating a correction target value to be supplied to said vibration correction means on the basis of a motion vector signal detected by said motion detection means; and sampling period varying means for setting a sampling period of the correction target value calculated by said signal processing means to be shorter than a sampling period of the motion vector signal.

2. An apparatus according to claim 1, wherein said vibration detection means comprises angular velocity detection means and second signal processing means for converting an angular velocity signal into an angular displacement signal.

3. An apparatus according to claim 1, wherein said vibration correction means comprises optical vibration correction means for optically correcting the vibration of the image or a variable angle prism.

4. An image pickup apparatus comprising:

vibration detection means for detecting vibration of a device;

motion detection means for detecting image motion from an image signal;

vibration correction means for correcting vibration of an image in accordance with one or both of output signals from said vibration detection means and said motion detection means;

signal processing means for calculating a correction target value for said vibration correction means on the basis of a motion vector signal detected by said motion detection means; and sampling period varying means for setting a sampling period of the correction target value calculated by said signal processing means to be shorter than a sampling period of the motion vector signal, wherein a lens unit including said vibration correction means is exchangeably detachable from a camera body.

5. An apparatus according to claim 4, wherein said vibration detection means comprises angular velocity detection means and second signal processing means for converting an angular velocity signal into an angular displacement signal.

6. An apparatus according to claim 4, wherein said vibration correction means comprises optical vibration correction means for optically correcting the vibration of the image or a variable angle prism.

7. An apparatus according to claim 4, wherein said sampling period varying means for setting the sampling period of the correction target value calculated by said signal processing means to be shorter than the sampling period of the motion vector signal is arranged in said lens unit.

8. An apparatus according to claim 1, wherein said vibration detection means detects the vibration of the device based on components in two orthogonal directions.

9. An apparatus according to claim 4, wherein said vibration detection means detects the vibration of the device based on components in two orthogonal directions.

10. A storage medium that stores a program for operating a computer as the respective means of any one of claims 1 to 7.

11. A lens unit detachable from an image pickup apparatus, comprising:

vibration detection means for detecting vibration of said image pickup apparatus;

vibration correction means for correcting vibration of an image on the basis of one or both of a motion vector component in an image signal detected on the side of said image pickup apparatus, and an output signal from said vibration detection means;

signal processing means for calculating a correction target value of said vibration correction means on the basis of the motion vector; and sampling period varying means for setting a sampling period of the correction target value calculated by said signal processing means to be shorter than a sampling period of the motion vector.

12. A unit according to claim 11, wherein said vibration detection means comprises an angular velocity sensor, and said vibration correction means comprises an optical vibration correction apparatus for optically correcting motion of an image.

13. A vibration correction apparatus comprising:

motion vector detection means for detecting a motion vector component in an image signal;

vibration correction means for correcting vibration of an image;

signal processing means for calculating a correction target value for said vibration correction means on the basis of an output from said motion vector detection means; and sampling period varying means for setting a sampling period of the correction target value output from said signal processing means to be shorter than a sampling period of the motion vector.

14. An apparatus according to claim 13, wherein said vibration correction means comprises an optical vibration correction apparatus for optically correcting motion of an image.

15. An apparatus according to claim 13, wherein said sampling period varying means sets a control period of said vibration correction means to be shorter than the motion vector detection period by interpolating an output from said signal processing means.

16. An image pickup apparatus comprising:

an image pickup element;

rewritable storage means;

first signal processing means for processing a video signal from said image pickup element, and writing the processed video signal in said storage means at a first rate;

second signal processing means for reading out the video signal from said storage means at a second rate; and function control means for controlling a function associated with imaging in accordance with a signal from said first signal processing means, wherein the first rate is set to be higher than the second rate and the first rate is set to be not less than twice higher than the second rate.

17. A camera comprising:

optical motion correction means for optically correcting motion of an image;

electronic motion correction means for electronically correcting the motion of the image;

electronic zoom means for electronically enlarging the image; and control means for, when said electronic zoom means is inactive, controlling to selectively operate said optical motion correction means and said electronic motion correction means, and for, when said electronic zoom means is active, controlling to operate both said optical motion correction means and said electronic motion correction means.

18. A camera according to claim 17, further comprising a physical sensor for physically detecting vibration, and a motion detection circuit for detecting motion of an image between fields or frames from an image signal.

19. A camera according to claim 17, wherein said electronic motion correction means comprises a memory for storing an input image, and corrects the motion of the image by varying a read location of the image from said memory.

20. A vibration correction apparatus comprising:

vibration detection means for detecting vibration of a device as components in two orthogonal directions;

optical vibration correction means for optically correcting vibration of an image in accordance with an output signal from said vibration detection means;

a storage circuit that stores an image input from a solid-state image pickup element;

image motion detection means for detecting motion of an image between fields or frames of the image input to said storage circuit from the solid-state image pickup element; and storage circuit control means for controlling said storage circuit so as to attain electronic zooming in accordance with a command from system control means, and for controlling reading of an image from said storage circuit in accordance with motion detected by said image motion detection means so as to perform both electronic and optical vibration corrections only during electronic zooming.

21. An apparatus for correcting image blur on the basis of at least one of a vibration signal physically detected and a motion signal of an object image which is detected from an image signal, said apparatus comprising:

a calculation device that calculates a correction target value signal used for correcting the image blur, on the basis of the motion signal of the object image detected from the image signal; and a correction target value supplying device that supplies the correction target value signal calculated by said calculation device to a vibration correction system, wherein a period at which said correction target value supplying device supplies the correction target value signal to the vibration correction system is shorter than a period at which said calculation device acquires the motion signal of the object image.

22. An apparatus according to claim 21, wherein said calculation device performs an interpolation calculation on the motion signal of the object image so as to set the period at which said correction target value supplying device supplies the correction target value signal to the vibration correction system, shorter than the period at which said calculation device acquires the motion signal of the object image.

23. An apparatus according to claim 21, further comprising a vibration detection sensor that physically detects vibration.

24. An apparatus according to claim 23, wherein said vibration sensor includes an angular velocity sensor.

25. An apparatus according to claim 21, further comprising the vibration correction system.

26. An apparatus according to claim 25, wherein said vibration correction system includes an optical member.

27. An apparatus for correcting image blur on the basis of a motion signal of an object image which is detected from an image signal, said apparatus comprising:

a calculation device that calculates a correction target value signal used for correcting the image blur, on the basis of the motion signal of the object image detected from the image signal; and a correction target value supplying device that supplies the correction target value signal calculated by said calculation device to a vibration correction system, wherein a period at which said correction target value supplying device supplies the correction target value signal to the vibration correction system is shorter than a period at which said calculation device acquires the motion signal of the object image.

28. An apparatus according to claim 27, wherein said calculation device performs an interpolation calculation on the motion signal of the object image so as to set the period at which said correction target value supplying device supplies the correction target value signal to the vibration correction system, shorter than the period at which said calculation device acquires the motion signal of the object image.

29. An apparatus according to claim 28, further comprising the vibration correction system.

30. An apparatus according to claim 29, wherein said vibration correction system includes an optical member.

* * * * *